(12) United States Patent
Price et al.

(10) Patent No.: US 9,527,395 B2
(45) Date of Patent: Dec. 27, 2016

(54) ACCESS ARRANGEMENT FOR THE POWER SYSTEM OF AN ELECTRIC VEHICLE

(71) Applicants: Raymond D Price, Shelby Township, MI (US); Kenneth J Wenzel, Farmington Hills, MI (US); Michael J Petkus, Clarkston, MI (US)

(72) Inventors: Raymond D Price, Shelby Township, MI (US); Kenneth J Wenzel, Farmington Hills, MI (US); Michael J Petkus, Clarkston, MI (US)

(73) Assignee: FCA US LLC, Auburn Hills, MI (US)

( * ) Notice: Subject to any disclaimer, the term of this patent is extended or adjusted under 35 U.S.C. 154(b) by 419 days.

(21) Appl. No.: 14/268,326

(22) Filed: May 2, 2014

(65) Prior Publication Data
US 2015/0314698 A1 Nov. 5, 2015

(51) Int. Cl.
*B60L 1/00* (2006.01)
*B60L 3/00* (2006.01)
*H02G 3/00* (2006.01)
*B60L 11/18* (2006.01)
*H01R 13/447* (2006.01)
*H01R 103/00* (2006.01)

(52) U.S. Cl.
CPC ........ *B60L 11/1851* (2013.01); *B60L 11/1818* (2013.01); *B60L 11/1824* (2013.01); *B60L 11/1864* (2013.01); *B60L 11/1874* (2013.01); *B60L 11/1875* (2013.01); *H01R 13/447* (2013.01); *B60L 2230/16* (2013.01); *H01R 2103/00* (2013.01); *H01R 2201/20* (2013.01); *H01R 2201/26* (2013.01); *Y02T 10/7005* (2013.01); *Y02T 90/121* (2013.01)

(58) Field of Classification Search
CPC .......................... B60L 11/1851; H01R 13/447
USPC .......................................................... 307/9.1
See application file for complete search history.

(56) References Cited

U.S. PATENT DOCUMENTS

| | | | |
|---|---|---|---|
| 4,180,302 A | 12/1979 | Gordon | |
| 5,510,725 A | 4/1996 | Schantz et al. | |
| 5,623,104 A | 4/1997 | Suga | |
| 6,967,486 B2 | 11/2005 | Schneider | |
| 7,977,814 B2 * | 7/2011 | Lucas | B60K 6/40 200/50.01 |
| 8,306,690 B2 | 11/2012 | Bertness et al. | |
| 8,560,254 B2 | 10/2013 | Newhouse et al. | |

* cited by examiner

*Primary Examiner* — Carlos Amaya
(74) *Attorney, Agent, or Firm* — Ralph E. Smith

(57) ABSTRACT

An access arrangement for a power system of an electrified vehicle includes a housing body, at least one electrical conductor, a passageway, and a closure. The electrical conductor passes through the housing body. The passageway extends inwardly from an opening on the housing body and intersects a portion of the electrical conductor within the housing body. The closure is positioned proximate to the opening. The closure is adjustable between a plurality of different configurations. The closure is adjustable between a closed configuration and an open configuration. The closure closes the passageway while in the closed configuration. The opening is at least partially exposed when the closure is in the open configuration. The closure is biased to return to the closed configuration from the open configuration. The passageway and closure are configured to cooperatively facilitate access for testing the electrical conductor.

16 Claims, 5 Drawing Sheets

ACCESS ARRANGEMENT FOR THE POWER SYSTEM OF AN ELECTRIC VEHICLE

FIELD

The present disclosure relates generally to an electrical connector that houses one or more electrical conductors and can be accessed to test for voltage in the housed electrical conductors.

BACKGROUND

Electric vehicles include Hybrid Electric Vehicles (HEVs), Plug-In Hybrid Electric Vehicles (PHEVs), and Battery Electric Vehicles (BEVs). In conventional electric vehicles, a high-voltage cable (hereafter "HV cable") extends from a battery pack and, during operation of the vehicle, is maintained at high voltage. Various vehicle systems tap into the HV cable and receive electrical power. One of the systems is an electric propulsion system. The distribution of power external to the battery pack is controlled by contactors inside the battery pack. When the electrical power system of the electric vehicle is de-energized, the contactors open and high voltage power is contained within the battery pack. When the electric vehicle is being serviced, it is necessary for the technician to ensure the contactors are open and no power is present outside of the battery pack before accessing electrical components. The technician does this by measuring for electrical power at a cable connection in a junction block with a removable cover. Several discrete connections are made in the junction block. Packaging of the junction block in a readily accessible location in the vehicle is difficult. In addition, the cover must be properly reinstalled for the vehicle to resume operation. Incorrectly installed covers can result in a vehicle shut-down, requiring a service visit by the customer and resulting in potential warranty costs to the manufacturer. A High Voltage Interlock (HVIL) is a control system added to electric vehicles to prevent the vehicle from powering-up if the cover of the junction box is not installed. However, the HVIL adds to the cost and complexity of the electrical system of the electrified vehicle.

SUMMARY

In one aspect, an access arrangement for a power system of an electrified vehicle is provided in accordance with the teachings of the present disclosure. In an exemplary implementation, the access arrangement includes a housing body, at least one electrical conductor, a passageway, and a closure. The electrical conductor passes through the housing body. The passageway extends inwardly from an opening on the housing body and intersects a portion of the electrical conductor within the housing body. The closure is positioned proximate to the opening. The closure is adjustable between a plurality of different configurations. The closure is adjustable between a closed configuration and an open configuration. The closure closes the passageway while in the closed configuration. The opening is at least partially exposed when the closure is in the open configuration. The closure is biased to return to the closed configuration from the open configuration. The passageway and closure are configured to cooperatively facilitate access for testing the electrical conductor.

In another aspect, a power system for an electrified vehicle is provided in accordance with the teachings of the present disclosure. In an exemplary implementation, the power system includes a battery pack, a vehicle propulsion system, a high-voltage (HV) cable, and an access arrangement. The HV cable places the battery pack and the propulsion system in electrical communication. The access arrangement is positioned along the HV cable, between the battery pack and the vehicle propulsion system. The access arrangement includes a housing body, a passageway, and a closure. The HV cable passes through the housing body. The passageway extends inwardly from an opening on the housing body and intersects the HV cable within the housing body. The closure is positioned proximate to the opening and is adjustable between a plurality of different configurations, including a closed configuration closing the passageway and an open configuration in which the opening is at least partially exposed. The closure is biased to return to the closed configuration from the open configuration. The passageway and closure are configured to cooperatively facilitate access for testing the HV cable.

In some implementations, the closure is adjustable between the closed configuration and the open configuration by being elastically deformed. For example, the closure can be punctured by a testing probe. The closure can be operable to return to the closed configuration when the test probe is withdrawn. In other implementations, the closure can be a flapper-type valve positioned in the passageway. During insertion, the test probe can urge the closure out of the closed configuration. The closure can elastically return to the closed configuration when the test probe is withdrawn. In one or more implementations, the closure can be biased by a spring.

Further areas of applicability of the teachings of the present disclosure will become apparent from the detailed description, claims, and the drawings provided hereinafter, wherein like reference numerals refer to like features throughout the several views of the drawings. It should be understood that the detailed description, including disclosed embodiments and drawings referenced therein, is merely exemplary in nature, intended for purposes of illustration only, and is not intended to limit the scope of the present disclosure, its application or uses. Thus, variations that do not depart from the gist of the present disclosure are intended to be within the scope of the present disclosure.

DESCRIPTION

Figure 1:
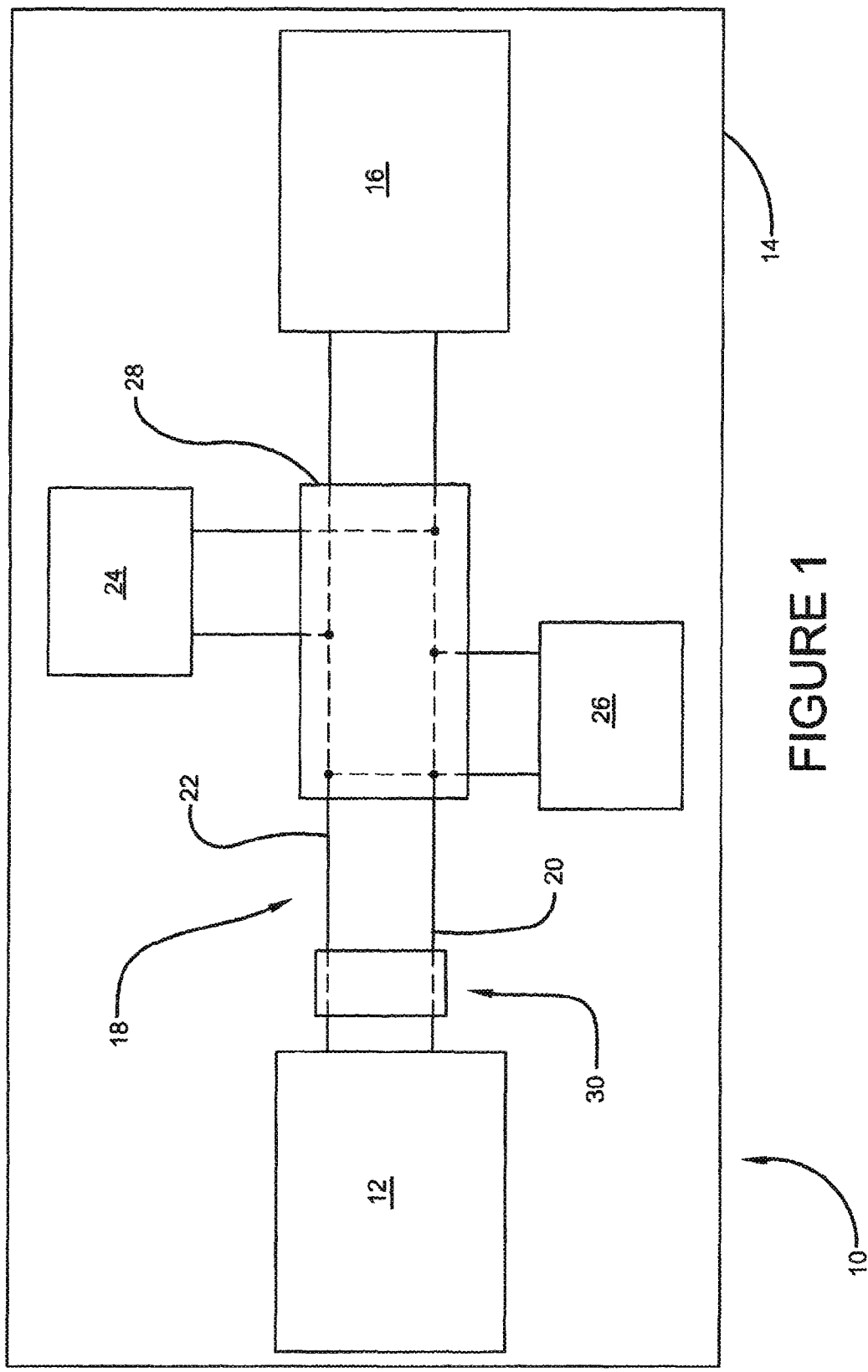
FIG. 1 is a schematic view of an exemplary power system for an electric vehicle according to the principles of the present disclosure.

With initial reference to FIG. 1, an exemplary power system 10 for an exemplary electric vehicle 14 includes a battery pack 12, a vehicle propulsion system 16, and a high-voltage (HV) cable 18. The exemplary electric vehicle 14 is a BEV. Alternative embodiments of the present disclosure can be practiced in HEVs or PHEVs. The vehicle propulsion system 16 receives electrical power from the battery pack 12 over the HV cable 18. The HV cable 18 thus places the battery pack 12 and the vehicle propulsion system 16 in electrical communication with one another. The exemplary HV cable 18 includes a positive lead 20 and a negative lead 22.

With continuing reference to FIG. 1, during the operation of the electric vehicle 14, the HV cable 18 is maintained at high voltage. Various vehicle systems tap into the HV cable 18 and receive electrical power. The exemplary embodiment illustrated includes a climate control auxiliary electrical system 24 in electrical communication with the HV cable 18. The exemplary climate control auxiliary electrical system 24 includes, by way of example and not limitation, fans, heating elements, and air distribution valves. The exemplary embodiment also includes a communications auxiliary electrical system 26 in electrical communication with the HV cable 18. The exemplary communications auxiliary electrical system 26 includes, by way of example and not limitation, a video display, a radio tuner, and speakers. Each auxiliary electrical system includes respective circuitry to step-down the voltage of the HV cable 18, as appropriate.

With continuing reference to FIG. 1, the distribution of power external to the battery pack 12 is controlled by contactors. The contactors are internal to the battery pack 12 and not shown in the schematic illustration of Figure 1. The contactors open and prevent high voltage power from being applied to the HV cable 18. When the electric vehicle 14 is being serviced, it is necessary for the technician to ensure that the contactors are open before accessing electrical components. In the current state of the art, the technician confirms the contactors are open by measuring for electrical power at an electrical connection in a junction block 28 with a removable cover. Several discrete connections of the power system 10 are made in the junction block 28. As a result, packaging of the junction block 28 in a readily accessible location within the vehicle is often challenging. Further, reinstallation of the cover may not be performed accurately, resulting in vehicle shut-down. The customer cannot access the cover, requiring a service visit for correction and possible warranty costs to the manufacturer. A High Voltage Interlock (HVIL) (not shown) is a control system that prevents a vehicle from powering-up if the cover of the junction box is not properly installed. However, the HVIL adds to the cost and complexity of the electrical system of the vehicle.

With continuing reference to FIG. 1, the exemplary power system 10 also includes an exemplary access arrangement 30. The access arrangement 30 provides access to the exemplary power system 10 for testing the position of the contactors in the battery pack 12. A technician can test whether or not the contactors are open, confirming that voltage from the battery pack 12 is not being applied to the HV cable 18. The access arrangement 30 is positioned along the HV cable 18 between the battery pack 12 and the vehicle propulsion system 16.

Figure 2:
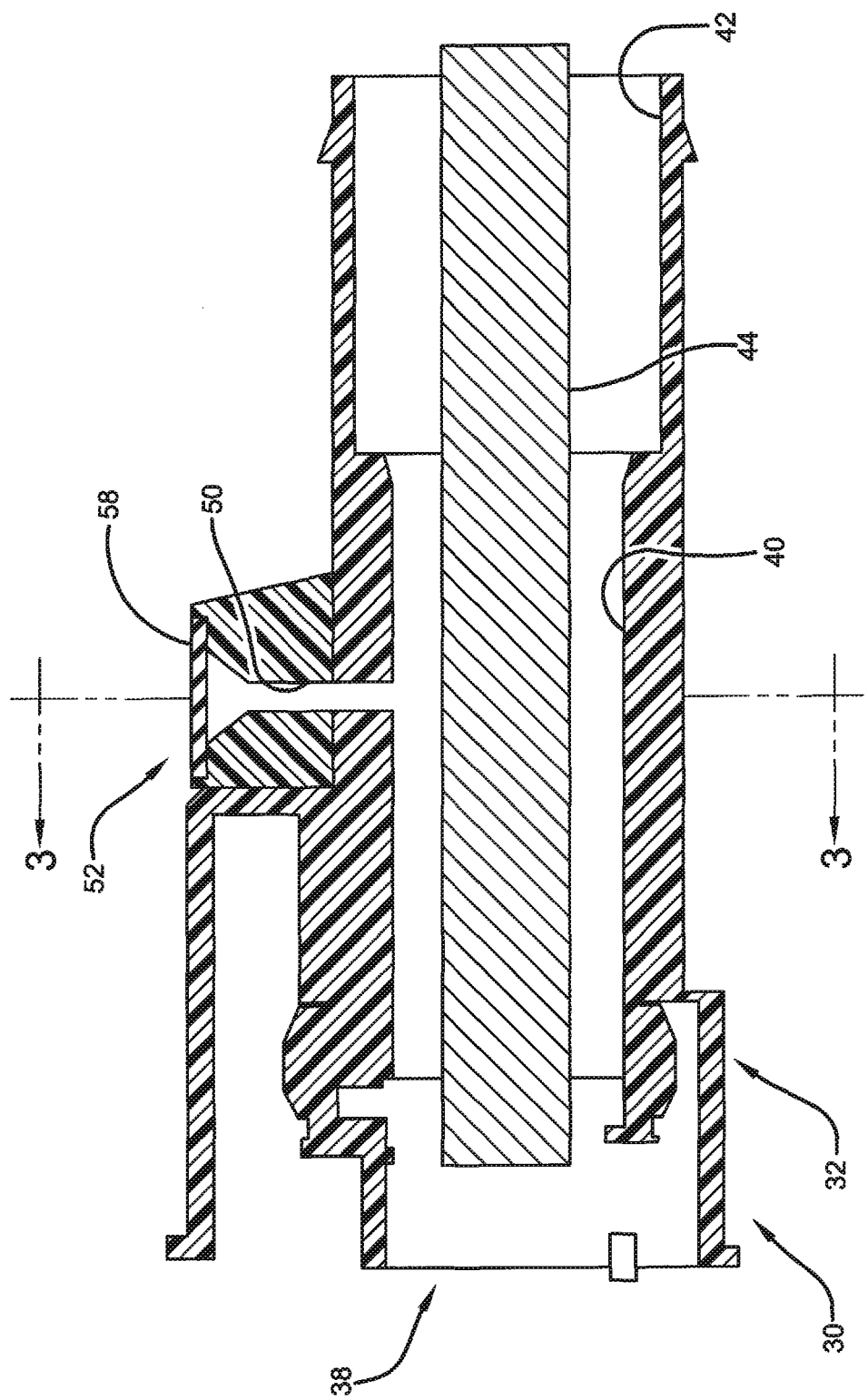
FIG. 2 is a side cross-sectional view of an exemplary access arrangement for a power system of an electric vehicle according to the principles of the present disclosure.
Figure 3:
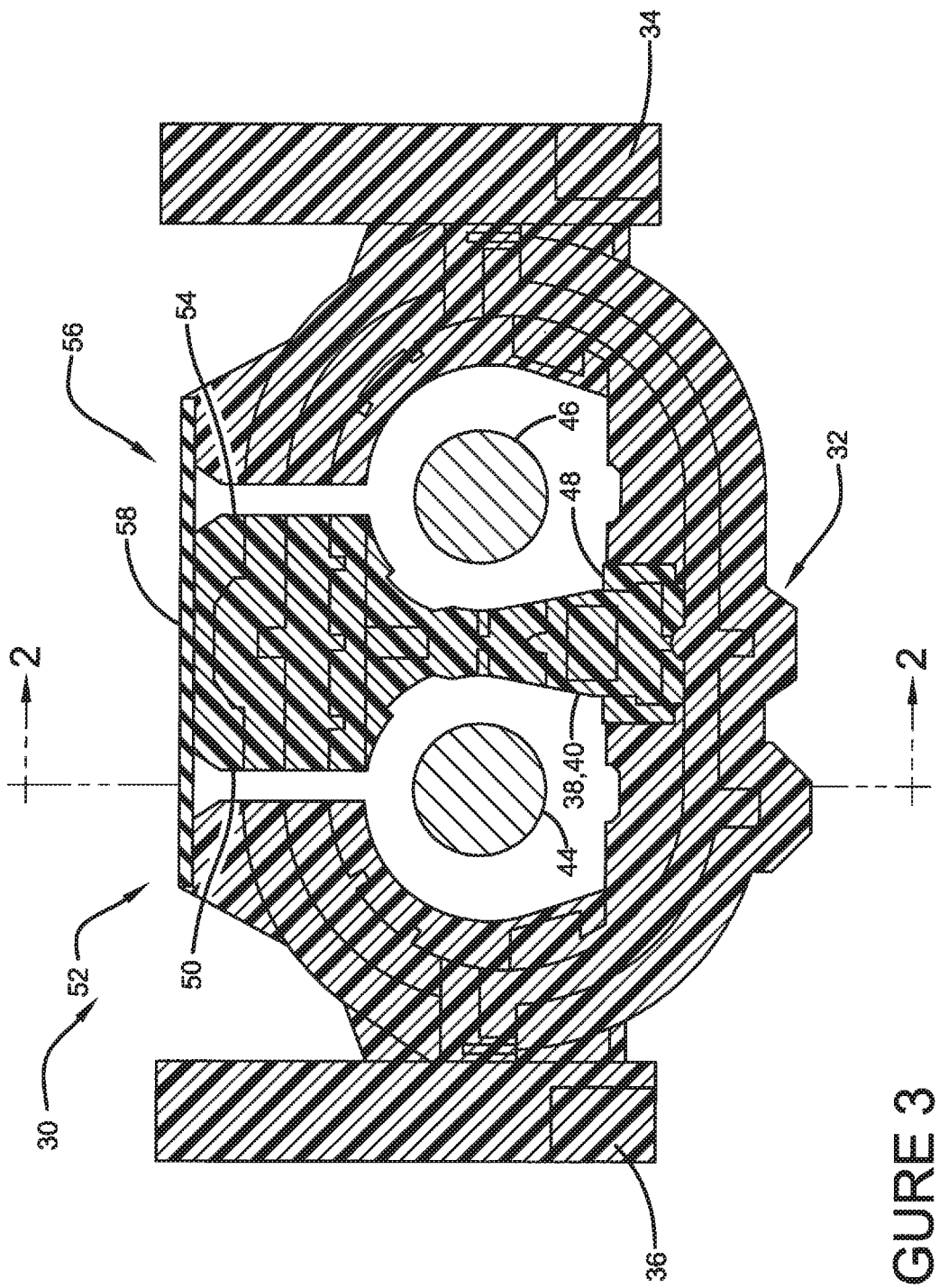
FIG. 3 is a front cross-sectional view of the access arrangement shown in FIG. 2 according to the principles of the present disclosure.

With continuing reference to FIG. 1 and initial reference to FIGS. 2-3, the exemplary access arrangement 30 includes a housing body 32. The housing body 32 is formed from a non-conductive material such as plastic. The housing body 32 includes integrally-formed structures to mount the access arrangement 30 in a vehicle, such as connector retention locks 34, 36. The exemplary HV cable 18 includes an electrical conductor 44 that passes through the housing body 32. The electrical conductor 44 extends through an aperture 38 including a wire insertion portion 40 and an entrance portion 42.

As shown in FIG. 3, the exemplary housing body 32 supports a second electrical conductor 46. The electrical conductor 44 is a portion of the positive lead 20 of the HV cable 18 and the electrical conductor 46 is a portion of the negative lead 22. The electrical conductor 46 passes through an aperture 48. The exemplary apertures 38 and 48 extend parallel to one another in the housing body 32.

With continuing reference to FIGS. 2 and 3, a passageway 50 extends through the housing body 32. The passageway 50 extends inwardly from an opening 52 on the housing body 32 and intersects the electrical conductor 44 within the housing body 32. The passageway 50 provides access for a test probe to test the voltage level of the electrical conductor 44. The exemplary housing body 32 also includes a passageway 54 extending inwardly from an opening 56 on the housing body 32 and intersecting the electrical conductor 46 within the housing body 32. The passageway 54 provides access for a test probe to test the voltage level of the electrical conductor 46.

With continuing reference to FIGS. 2 and 3, a closure 58 is positioned proximate to the opening 52. The closure 58 is adjustable between a plurality of different configurations including a closed configuration and an open configuration. In the closed configuration, the closure 58 closes the passageway 50. When the closure 58 is in the open configuration, the opening 52 is at least partially exposed. The closure 58 is biased to return to the closed configuration from the open configuration.

With continuing reference to FIGS. 2 and 3, the exemplary closure 58 is adjustable between the closed configuration and the open configuration by being elastically deformed. For example, the exemplary closure 58 is formed from an elastomer or elastomeric material and is punctured by a test probe. The test probe forms an opening within the closure 58 itself. After the voltage level of the electrical conductor 44 is assessed, the test probe is withdrawn from the passageway 50 and from the closure 58. The exemplary closure 58 is operable to automatically reseal or self-seal after the test probe is removed. In other words, the closure 58 is biased to return to the closed configuration from the open configuration by elastic restoration.

With continuing reference to FIGS. 2 and 3, the closure 58 is formed as a strip of elastomeric material coupled to the housing body 32. In one exemplary implementation, the closure 58 is interconnected to the housing body 32 with adhesive. As shown in FIG. 3, the closure 58 extends across both openings 52, 56. The closure 58 functions similarly with respect to a test probe inserted in the passageway 54 to test the electrical conductor 46.

With continuing reference to FIGS. 1-3, the exemplary access arrangement 30 provides a simplified structure for voltage testing. The electrical conductors 44, 46 are continuous through the housing. Thus, the access arrangement 30 is not a junction block. The access arrangement 30 can therefore be smaller and permit greater flexibility relative to positioning within the vehicle. Further, the exemplary access arrangement 30 is positionable closer to the battery pack 12 than the auxiliary electrical systems 24 and 26 as well as the vehicle propulsion system 16.

Figure 4:
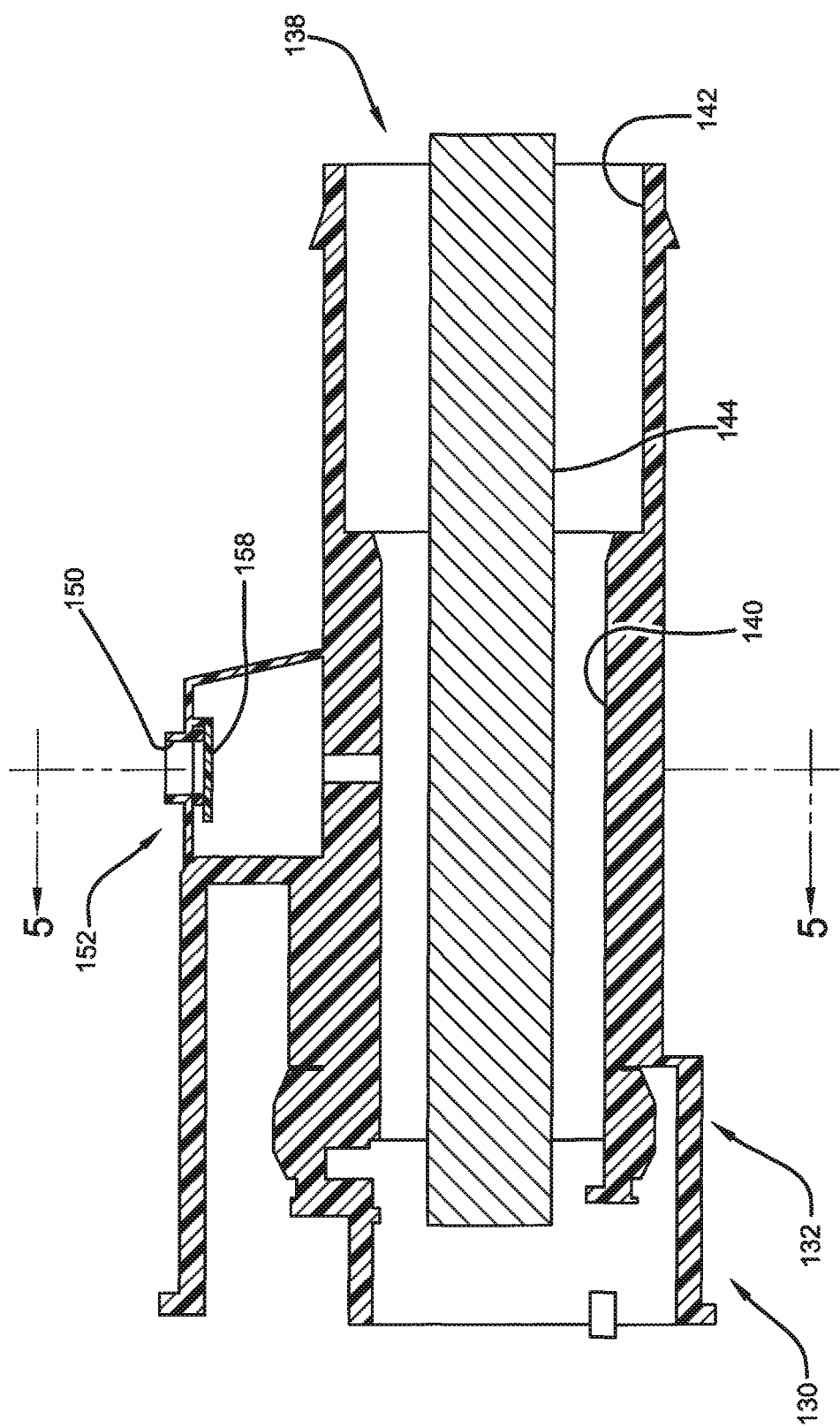
FIG. 4 is a side cross-sectional view of an exemplary alternative access arrangement for a power system of an electric vehicle according to the principles of the present disclosure.
Figure 5:
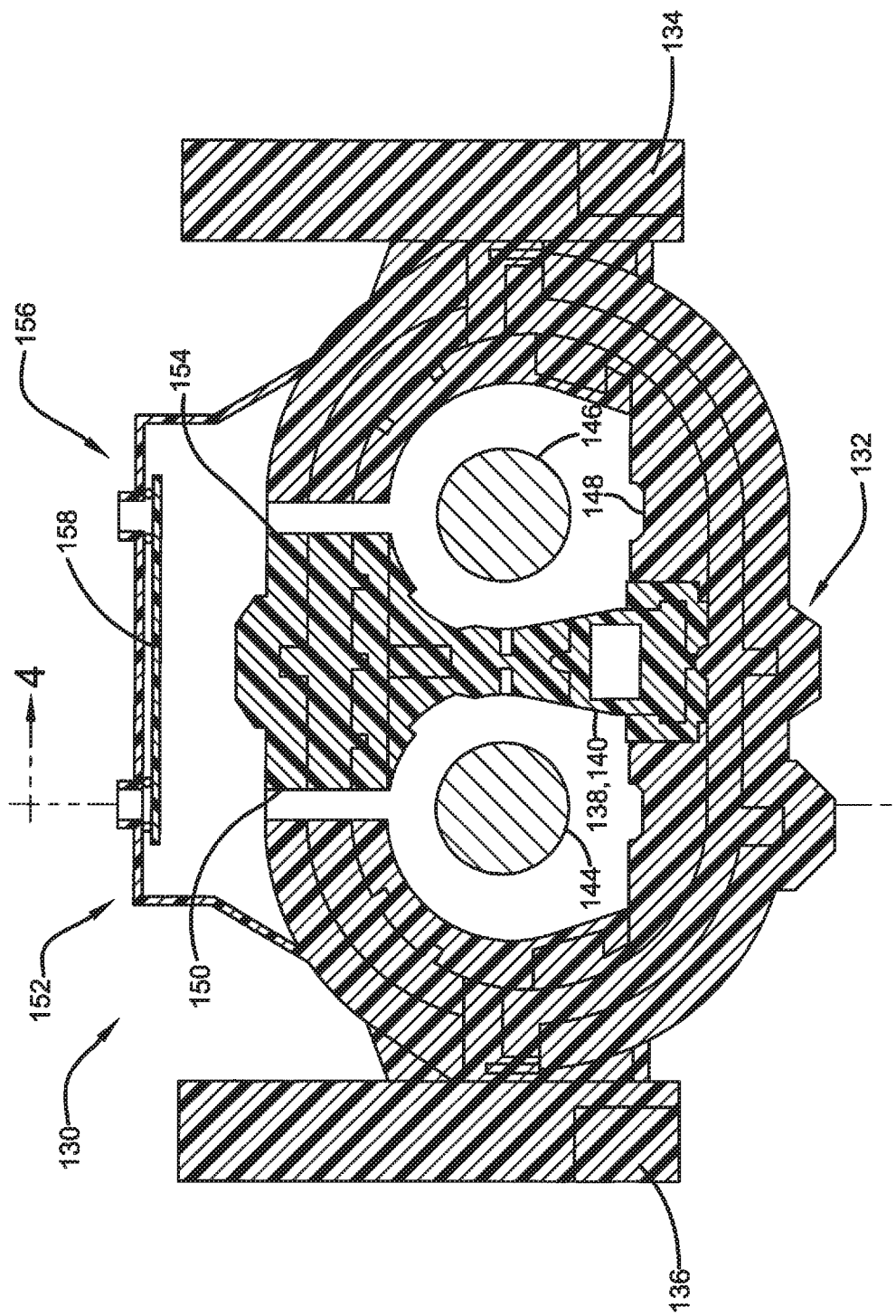
FIG. 5 is a front cross-sectional view of the access arrangement shown in FIG. 4 according to the principles of the present disclosure.

With initial reference to FIGS. 4 and 5, an alternative exemplary access arrangement 130 provides access to a power system for testing the position of the contactors in a battery pack. The exemplary access arrangement 130 includes a housing body 132. The housing body 132 is formed from a non-conductive conductive material such as plastic. The housing body 132 includes integrally-formed structures to mount the access arrangement 130 in a vehicle, such as connector retention locks 134, 136. An electrical conductor 144 is a portion of an HV cable and passes through the housing body 132. The electrical conductor 144 extends through an aperture 138 including a wire insertion portion 140 and an entrance portion 142.

As shown in FIG. 5, the exemplary housing body 132 supports a second electrical conductor 146. The electrical conductor 144 is a portion of a positive lead of an HV cable and the electrical conductor 146 is a portion of a negative lead. The electrical conductor 146 passes through an aperture 148. The exemplary apertures 138 and 148 extend parallel to one another in the housing body 132.

With continuing reference to FIGS. 4 and 5, a passageway 150 extends through the housing body 132. The passageway 150 extends inwardly from an opening 152 on the housing body 132 and intersects the electrical conductor 144 within the housing body 132. The passageway 150 provides access for a test probe to test the voltage level of the electrical conductor 144. The exemplary housing body 132 also includes a passageway 154 extending inwardly from an opening 156 on the housing body 132 and intersecting the electrical conductor 146 within the housing body 132. The passageway 154 provides access for a test probe to test the voltage level of the electrical conductor 146.

With continuing reference to FIGS. 4 and 5, a closure 158 is positioned proximate to the opening 152. The closure 158 is adjustable between a plurality of different configurations including a closed configuration and an open configuration. In the closed configuration, the closure 158 closes the passageway 150. When the closure 158 is in the open configuration, the opening 152 is at least partially exposed. The closure 158 is biased to return to the closed configuration from the open configuration.

With continuing reference to FIGS. 4 and 5, the exemplary closure 158 is adjustable between the closed configuration and the open configuration by being elastically deformed. For example, the exemplary closure 158 is integrally-formed with the housing body 132 and is shaped as a flapper valve. The closure 158 is positioned within the passageway 150 and pivotally moveable relative to the housing body 132. The insertion of the test probe in the opening 152 forces the closure 158 away from the opening 152. The closure 158 is biased to return to the closed configuration from the open configuration by elastic restoration. In other words, the closure 158 returns to closed configuration when the test probe is removed by bending.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An access arrangement for a power system of an electrified vehicle, the access arrangement comprising:
a housing body;
at least one electrical conductor positioned in the housing body;
a passageway extending inwardly from an opening on the housing body and intersecting a portion of the at least one electrical conductor within the housing body; and
a closure positioned proximate to the opening and adjustable between a plurality of different configurations, including a closed configuration closing the passageway and an open configuration in which the opening is at least partially exposed, wherein the closure is biased to return to the closed configuration from the open configuration, and wherein the passageway and closure are configured to cooperatively facilitate access for testing the electrical conductor.

2. The access arrangement of claim 1, further comprising an aperture extending through the housing body, the aperture intersecting the passageway and the at least one electrical conductor extending through the housing body in the aperture.

3. The access arrangement of claim 1, wherein the closure is adjustable between the closed configuration and the open configuration by being elastically deformed.

4. The access arrangement of claim 1, wherein the closure is adjustable between the closed configuration and the open configuration by being punctured.

5. The access arrangement of claim 4, wherein the closure is operable to automatically reseal after being punctured.

6. The access arrangement of claim 1, wherein the closure is pivotally moveable relative to the housing body.

7. The access arrangement of claim 1, wherein the closure is positioned within the passageway.

8. The access arrangement of claim 1, wherein the closure is interconnected to the housing body with adhesive.

9. The access arrangement of claim 1, wherein the at least one electrical conductor is continuous through the housing.

10. The access arrangement of claim 1, wherein the closure is biased to return to the closed configuration from the open configuration by elastic restoration.

11. The access arrangement of claim 10, wherein the closure is biased to return to the closed configuration from the open configuration by automatically closing an opening formed in the closure.

12. The access arrangement of claim 10, wherein the closure is biased to return to the closed configuration from the open configuration by a portion of the closure at least partially bending.

13. A power system for an electrified vehicle, the power system comprising:
a battery pack;
a vehicle propulsion system;
a high-voltage (HV) cable placing the battery pack and the propulsion system in electrical communication; and
an access arrangement positioned along the HV cable between the battery pack and the vehicle propulsion system, the access arrangement including:
a housing body, wherein the HV cable passes into the housing body,
a passageway extending inwardly from an opening on the housing body and intersecting the HV cable within the housing body, and
a closure positioned proximate to the opening and adjustable between a plurality of different configurations including a closed configuration closing the passageway and an open configuration in which the opening is at least partially exposed, wherein the closure is biased to return to the closed configuration from the open configuration, and wherein the passageway and closure are configured to cooperatively facilitate access for testing the HV cable.

14. The power system of claim 13, further comprising a junction block housing a plurality of electrical connections, wherein the access arrangement is distinct from and positioned closer to the battery pack than the junction block.

15. The power system of claim 13, further comprising at least one auxiliary electrical system in electrical communication with the HV cable, wherein the access arrangement is positioned closer to the battery pack than at least one of the at least one auxiliary electrical system and the vehicle propulsion system.

16. The power system of claim 13, wherein a portion of the HV cable within the housing body includes a single positive lead and a single negative lead.

\* \* \* \* \*